United States Patent
Park (10) Patent No.: US 6,842,189 B2
(45) Date of Patent: Jan. 11, 2005

(54) ROAD MONITORING METHOD FOR A VEHICLE AND A SYSTEM THEREOF

(75) Inventor: Kwang-Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 560 days.

(21) Appl. No.: 10/028,692

(22) Filed: Dec. 28, 2001

(65) Prior Publication Data

US 2003/0043269 A1 Mar. 6, 2003

(30) Foreign Application Priority Data

May 25, 2001 (KR) .......................................... 2001-28901

(51) Int. Cl.⁷ .............................. H04N 7/18; H04N 9/47
(52) U.S. Cl. ........................ 348/148; 348/139; 382/106; 356/3; 356/10; 356/22
(58) Field of Search ......................... 348/139; 382/106; 356/3, 4

(56) References Cited

U.S. PATENT DOCUMENTS

| | | | |
|---|---|---|---|
| 5,612,686 A | 3/1997 | Takano et al. | |
| 5,987,174 A | 11/1999 | Nakamura et al. | |
| 6,037,975 A | * 3/2000 | Aoyama | 348/113 |
| 6,343,247 B2 | * 1/2002 | Jitsukata et al. | 701/28 |
| 6,380,885 B2 | * 4/2002 | Shirai et al. | 342/70 |
| 6,476,780 B2 | * 11/2002 | Matsunaga | 345/56 |
| 6,477,260 B1 | * 11/2002 | Shimomura | 382/106 |
| 6,553,130 B1 | * 4/2003 | Lemelson et al. | 382/104 |
| 6,593,873 B2 | * 7/2003 | Samukawa et al. | 342/70 |

* cited by examiner

Primary Examiner—Charles E Parsons
(74) Attorney, Agent, or Firm—Antonelli, Terry, Stout & Kraus, LLP

(57) ABSTRACT

In order to measure an actual distance from a vehicle to a target, the target is detected from a picture signal generated by a camera mounted on a vehicle, a horizontally estimated distance of the target is calculated, variables including a vertical angle of the target on a circumference and a curvature radius of the circumference are calculated, and then the actual distance is calculated based on the vertical angle and the curvature radius.

15 Claims, 5 Drawing Sheets

ROAD MONITORING METHOD FOR A VEHICLE AND A SYSTEM THEREOF

BACKGROUND OF THE INVENTION

1. Field of the Invention

The present invention relates to a method and an apparatus for monitoring a road, and more particularly, to a method and an apparatus for monitoring a road wherein road information, such as a distance to a preceding vehicle, is acquired using a picture captured by a camera.

2. Description of the Related Art

Recently, an unmanned vehicle, which perceives driving circumstances and automatically controls driving performance, has been under development. Such an unmanned vehicle usually includes a lane marker detector for detecting lane markers to be used for keeping the unmanned vehicle running in the same lane, and a vehicle detector for detecting a preceding vehicle in order to prevent the unmanned vehicle from bumping the preceding vehicle.

The lane marker detector detects lane markers from a picture captured by an input apparatus such as a camera, such that the road on which the unmanned vehicle is running can be modeled.

Marking objects disposed on the road according to a predetermined scheme are detected for modeling of the road, and a typical example of the marking objects is a lane marker.

The lane marker detector, including a camera for capturing a forward picture, usually perceives lane markers from the captured picture based on a brightness difference between a road surface and the lane markers because the lane markers are brighter than the road surface.

The vehicle detector detects a preceding vehicle by various methods.

One example of these is a stereo camera method, where a distance to a preceding vehicle is calculated based on an angular difference of two cameras aiming at the preceding vehicle.

A laser radar method and a mm-wave (electromagnetic wave whose wavelength is of an order of magnitude of millimeters) radar method are also used to detect a distance to a preceding vehicle, and in such methods, a reflective wave reflected from the preceding vehicle is detected and used for calculating the distance.

As described above, according to the prior art, an unmanned vehicle must be equipped with two different apparatus, a lane marker detector and a vehicle detector for distance control of the vehicle.

Therefore, it is obvious that the cost for realizing an unmanned vehicle must be reduced if there is provided a method for calculating a distance to a preceding vehicle from a captured picture.

Moreover, the stereo camera method has difficulty in setting of the two cameras, the laser radar method is apt to lose reliability because a laser ray is too narrow and easily scattered by moisture in the air, and the mm-wave radar is very expensive.

SUMMARY OF THE INVENTION

Therefore it is one object of this invention to provide a method and system in which a distance to a preceding vehicle is calculated based on a picture signal received from a picture input apparatus that is already installed in a lane marker detector.

In order to achieve the above object, this invention provides a road monitoring system for a vehicle comprising a camera for generating a picture signal and an electronic control unit for performing a road monitoring method of this invention.

The road monitoring method of this invention for a vehicle using a camera comprises receiving a picture signal from said camera; detecting a target from said picture signal; calculating a horizontally estimated distance from said vehicle to said target; calculating variables including a vertical angle of said target on a circumference and a curvature radius of said circumference; and calculating an actual distance from said vehicle to said target based on said vertical angle and said curvature radius.

In further description of this invention, symbols are defined such as: $\alpha$ as a proportional coefficient, f as a focal distance of said camera, h as a height of a center of said camera from a road surface, y as a vertical picture-coordinate of said target, c' as a vertical picture-coordinate of a horizon in said picture signal, c as a vertical picture-coordinate of a horizon of a flat road, $\theta$ as a constant satisfying an equation c=f×tan($\theta$), L as a horizontally estimated distance of said target, $\phi$ as a vertical angle of the target on said circumference, and R as a curvature radius of said circumference.

Said calculating a horizontally estimated distance calculates said horizontally estimated distance as a value of L satisfying an equation $$L = \alpha \cdot h \cdot \frac{f^2 + y \cdot c}{f \cdot (y - c)}.$$

Said calculating variables is performed by including determining whether a road is curved upward or downward; calculating said vertical angle of said target on said circumference; and calculating a corresponding curvature radius among an upward curvature radius and a downward curvature radius according to a determination of said determining whether said road is curved upward or downward.

In said determining whether a road is curved upward or downward, whether said road is curved upward or downward can be determined based on a shape of a plurality of lane markers, said plurality of lane markers being detected from said picture signal.

Alternatively, in said determining whether a road is curved upward or downward, it may be determined that said road is curved upward if a vertical picture-coordinate of a horizon in said picture signal is higher than a predetermined vertical picture-coordinate, and said road is curved downward if a vertical picture-coordinate of a horizon in said picture signal is lower than said predetermined vertical picture-coordinate.

Said vertical angle of said target can be calculated as a value of $\phi$ satisfying an equation c'=f×tan($\phi$+$\theta$).

Said upward curvature radius can be calculated as a value of R satisfying an equation $$L = \frac{h \cdot R \cdot \sin\phi}{h - R \cdot (1 - \cos\phi)},$$

where said value of R satisfying said equation $$L = \frac{h \cdot R \cdot \sin\phi}{h - R \cdot (1 - \cos\phi)}$$

is preferably calculated based on a predetermined map having variables of said L and said φ.

Also, said downward curvature radius can be calculated as a value of R satisfying an equation $$L = \frac{h \cdot R \cdot \sin\phi}{h + R \cdot (1 - \cos\phi)},$$

where said value of R satisfying said equation $$L = \frac{h \cdot R \cdot \sin\phi}{h + R \cdot (1 - \cos\phi)}$$

is preferably calculated based on a predetermined map having variables of said L and said φ.

Said actual distance can be then calculated as an absolute value of l, said l satisfying an equation l=Rφ.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1A:
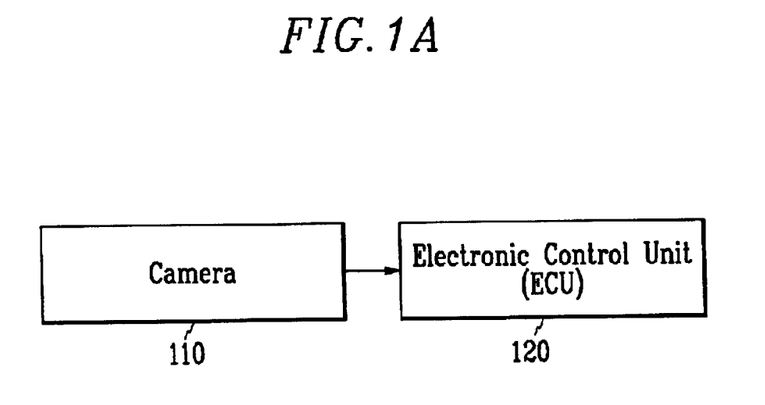
FIG. 1A is a block diagram of a road monitoring system for a vehicle according to a preferred embodiment of the present invention.

As shown in FIG. 1A, a preferred embodiment of a road monitoring system of the present invention includes a camera 110 generating a picture signal, and an electronic control unit 120 (referred to as "ECU" hereinafter).

The camera 110 is preferably a CCD (Charge Coupled Device) camera such that a captured picture can be easily digitalized to continuously generate picture signals.

The ECU 120 can be realized by one or more processors activated by predetermined software, and the predetermined software can be programmed to perform each step of a road monitoring method according to a preferred embodiment of this invention.

Figure 1B:
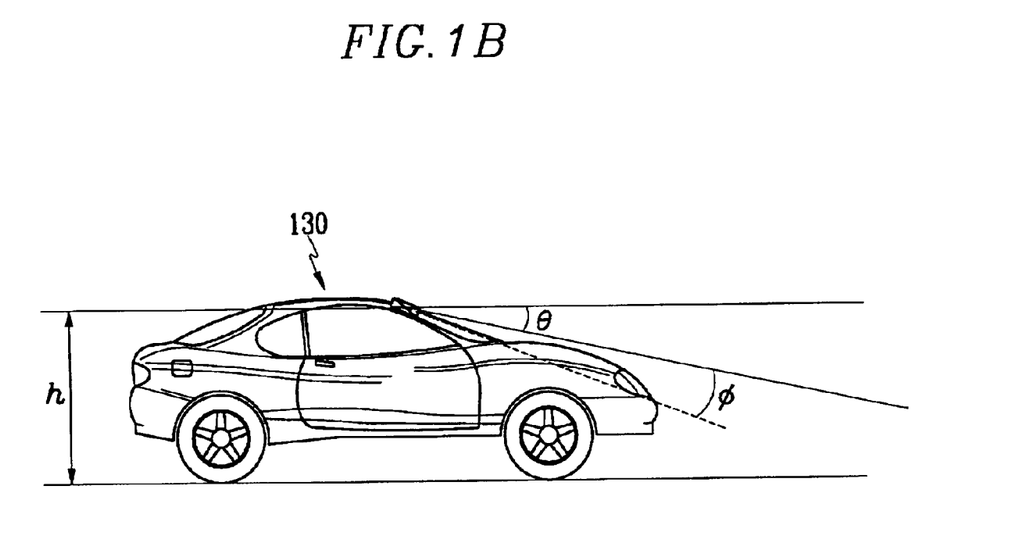
FIG. 1B is a drawing for showing a geometrical relationship between the vehicle and a camera installed thereon.

The ECU 120 can be disposed at any location in a vehicle 130, and the camera 110 is, as shown in FIG. 1B, disposed at an upper front side of the vehicle 130, for example, between a rearview mirror (not shown) and a windshield (not shown).

For references hereinafter, a height h and an angle θ are respectively defined as a height of a center of said camera from a road surface, and an angle between a line that the camera 110 is aiming along and a horizontal line.

The height h and angle θ, although they can be modified according to driving history, can be regarded as constants determined when the camera 110 is installed.

An angle φ shown in FIG. 1B is discussed later.

A road on which the vehicle 130 runs can be flat, upwardly curved (i.e., in a concave shape), or downwardly curved (i.e., in a convex shape).

Figure 2:
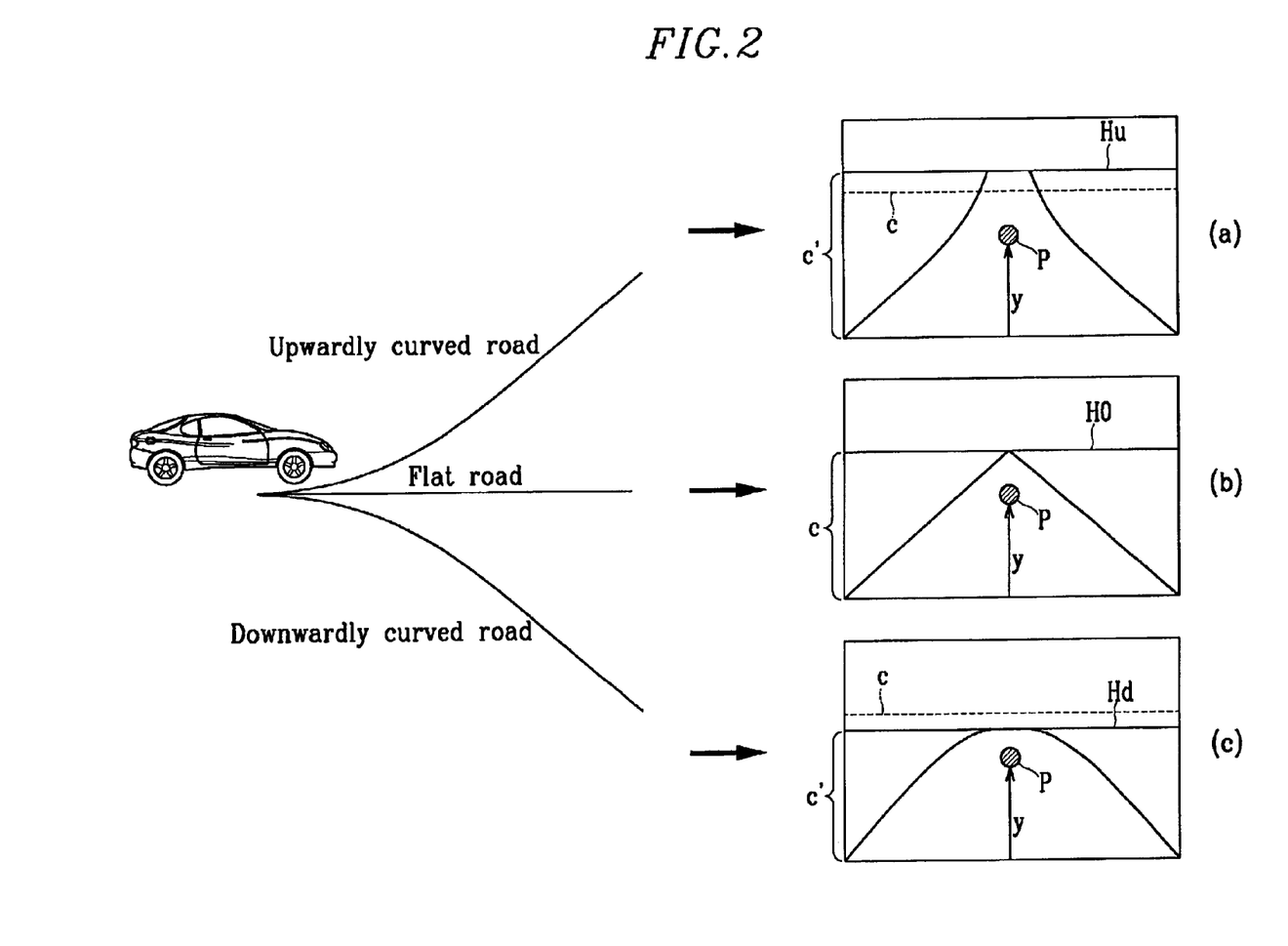
FIG. 2 is a drawing showing a variety of shapes of lane markers and a horizon detected from a picture signal received from the camera, according to whether a forward road is curved upward, flat, or curved downward.

FIG. 2 shows such variety of road and consequent shapes of lane markers and the horizon that are detected from a picture signal received from the camera.

The shape (b) is related to a case in which the road is flat, where the lane markers, starting from both sides of the bottom of the picture, meet at a point above the bottom and the lane markers are formed as straight lines.

The point where the lane markers meet each other corresponds to a horizon H0, and c denotes the vertical picture-coordinate of the horizon of the flat road.

When a forward road is curved upward, the lane markers are curved as shown in shape (a), where a left lane marker is curved leftward and a right lane marker is curved rightward. Therefore, the point at which the two lane markers meet is raised higher than c, or the two lane markers do not meet before the horizon.

If the lane markers meet each other, the point at which the lane markers meet must be on the horizon Hu. However, even if the lane markers do not meet before their ends, a line connecting their ends must be the horizon Hu.

Therefore, the horizon Hu must be above the horizon H0, and its vertical picture-coordinate is denoted as c'.

To the contrary, in a shape (c) related to a case when the road is curved downward, a left lane marker is curved rightward and a right lane marker is curved leftward, such that the point at which the lane markers meet each other or at a line connecting their ends is formed lower than c. Therefore, a vertical picture-coordinate c' of its corresponding horizon Hd is smaller than c.

A point P shown in each of shapes (a), (b), and (c) denotes a target of which a distance from the vehicle 130 shall be calculated, and y denotes a vertical picture-coordinate of the target P. The target P can be defined as any kind of object on the road, and a preceding vehicle can be set as the target P when this embodiment of this invention is applied for distance-controlling between vehicles.

A road monitoring method according to a preferred embodiment of the present invention is hereinafter described in detail.

Figure 3:
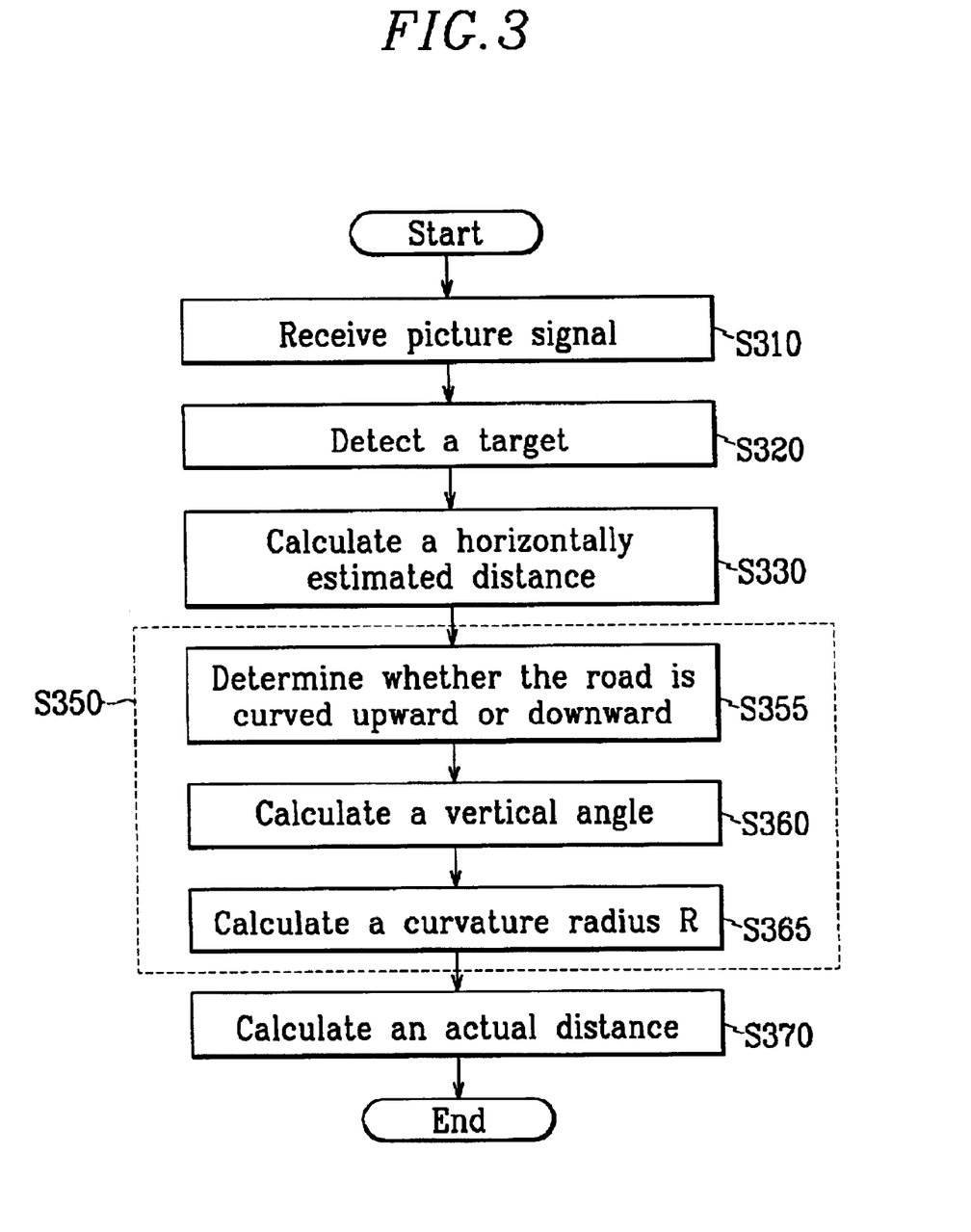
FIG. 3 is a flowchart showing a road monitoring method using a camera according to a preferred embodiment of the present invention.

The camera 110 installed in the vehicle 130 captures a picture of a forward road, and after generating a corresponding picture signal, transmits the picture signal to the ECU 120 at step S310.

The ECU 120 detects the target P from the received picture signal at step S320. A variety of methods to detect the target from a picture signal are already known to a person skilled in the art.

When the target P is detected at step S320, the ECU 120 calculates a horizontally estimated distance L from the vehicle 130 to the detected target P at S330.

The horizontally estimated distance L denotes a distance between the vehicle 130 and the target P calculated on the supposition that they are on the same plane, that is, on the supposition that the vehicle 130 is running on a flat road. Such horizontally estimated distance L is calculated as a value satisfying an equation $$L = \alpha \cdot h \cdot \frac{f^2 + y \cdot c}{f \cdot (y - c)},$$

where $\alpha$, f, c, and y respectively denote a proportional coefficient, a focal distance of the camera 110, a vertical picture-coordinate of the horizon of a flat road, and a vertical picture coordinate of the target P.

It is obvious that the values of f and h are already determined when the target P is detected at step S320.

A constant value of the proportional coefficient $\alpha$ can vary with respect to the camera 110 and its installation scheme. However, a preferable value of $\alpha$ can be easily determined by one or more simple experiments after the camera 110 is installed.

When the horizontally estimated distance L is calculated at step S330, the ECU 120 calculates a vertical angle $\phi$ of the target P on a circumference and a curvature radius R of the circumference at step S350.

The circumference is a circumference of a circle with which a forward road curved upward or downward is approximated.

A process for calculating the variables $\phi$ and R is described in detail hereinafter.

Firstly, it is determined whether the road is curved upward or downward at step S355.

Whether the road is curved upward or downward can be determined based on shapes of a plurality of lane markers, where the plurality of lane markers is detected from said picture signal, which is described in more detail with reference to FIGS. 4A–4E as follows.

Lane markers obtained from the picture signal can be formed as shown in FIGS. 4A–4E.

Figure 4A:
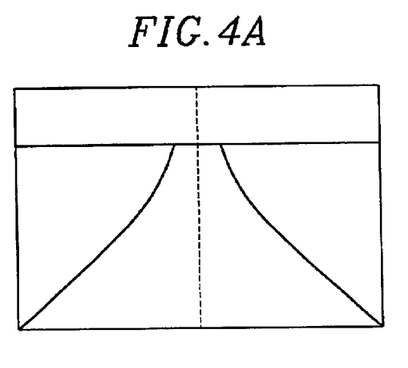
FIG. 4A through FIG. 4E are drawings showing a variety of shapes of lane markers and the horizon detected from a picture signal received from the camera.

In a case that a left lane marker is curved leftward and a right lane marker is curved rightward as shown in FIG. 4A, it can be determined that the road is curved upward.

Figure 4B:
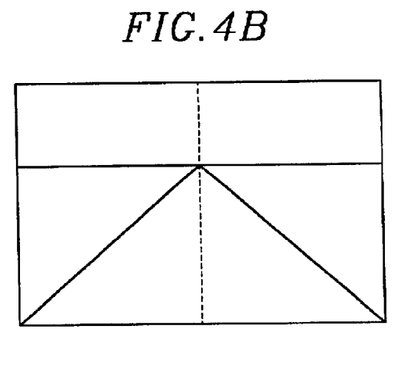
Figure 4C:
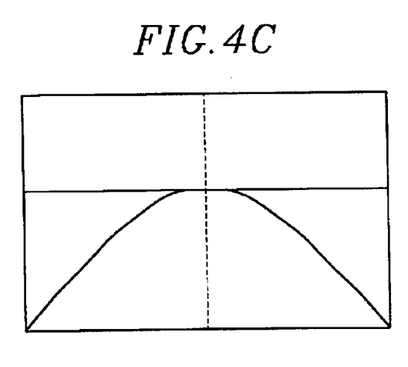
Figure 4D:
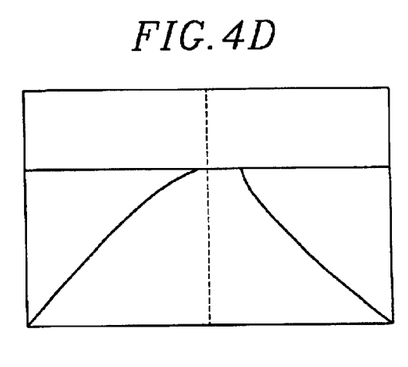
Figure 4E:
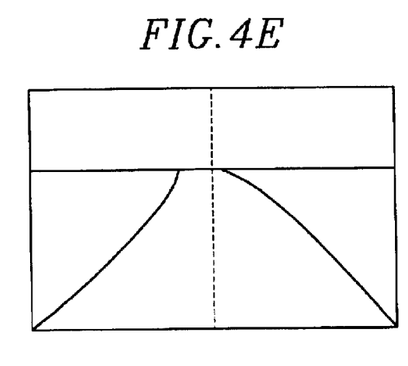

When the left and right lane markers are straight lines as shown in FIG. 4B, it can be determined that the road is flat.

In a case that a left lane marker is curved rightward and a right lane marker is curved leftward as shown in FIG. 4A, it can be determined that the road is curved downward.

If the left and right lane markers are curved in the same direction, the ECU 120 does not determine that the road is curved upward or downward.

The step S355 can be realized in another way.

The ECU 120 can determine that the road is curved upward if a vertical picture-coordinate c' of a horizon detected from the picture signal is greater than a vertical picture-coordinate c of a horizon of a flat road. Also, the ECU 120 can determine that the road is curved downward if a vertical picture-coordinate c' of a horizon detected from the picture signal is smaller than a vertical picture-coordinate c of a horizon of a flat road.

When it is determined whether the road is curved upward or downward at step S355, the ECU 120 calculates the vertical angle $\phi$ at step S360.

The vertical angle $\phi$ can be determined as a value satisfying an equation c'=f×tan($\phi$+$\theta$), where $\theta$ denotes a value satisfying an equation c=f×tan($\theta$).

The equation c'=f×tan($\phi$+$\theta$) must result in a correct value of $\phi$ because it can be assumed that, as shown in FIG. 1B, an aiming angle of the camera 110 is deviated by the angle $\phi$ if c' determined from the picture signal does not equal c.

In this case, the equation c'=f×tan($\phi$+$\theta$) must hold because it is only another form of the equation c=f×tan($\theta$) which is a correct relation between a vertical picture-coordinate c and camera angle $\theta$.

When the vertical angle $\phi$ is calculated at step S360, the ECU 120 calculates a corresponding curvature radius among an upward curvature radius and a downward curvature radius according to a determination of step S355.

That is, the ECU 120 calculates an upward curvature radius when the road is curved upward and a downward curvature radius when the road is curved downward, and each calculation method of upward/downward curvature radius is hereinafter described.

A calculation method of an upward curvature radius is described with reference to FIG. 5, where the upward curvature radius is denoted as R.

Points A, B, and C respectively denote a location of the camera 110, an actual location of the target P, and a horizontally estimated location of the target P, estimated at step S330 on the supposition that the target P is on the same plane with the vehicle 130.

Also, h, $\phi$, R, and l respectively denote a height of a center of the camera 110 from the road surface, a vertical angle of the target P on a circumference 510, a curvature radius of the circumference 510, and an actual distance of the target P from the position O of the vehicle 130. The actual distance l is defined as a length of an arc OB.

Because of the geometrical relationship, variables L, R, h, and $\phi$ satisfy an equation $$L = \frac{h \cdot R \cdot \sin\phi}{h - R \cdot (1 - \cos\phi)}.$$

The ECU 120 can calculate a value of R as a value satisfying this equation because h is determined at installation of the camera 110, and L and $\phi$ are values calculated at steps S330 and S360.

The value of R satisfying the equation $$L = \frac{h \cdot R \cdot \sin\phi}{h - R \cdot (1 - \cos\phi)}$$

is preferably calculated based on a predetermined map having variables of L and $\phi$, in order to reduce calculation time.

A calculation method of a downward curvature radius is described with reference to FIG. 6, where the downward curvature radius is denoted as R.

Figure 5:
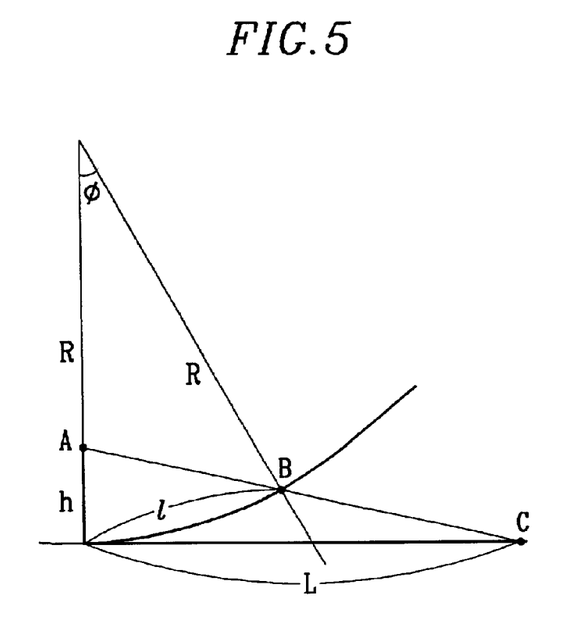
FIG. 5 is a drawing for geographically explaining how an actual distance to a target can be calculated when a forward road is curved upward.

Points A, B, and C and variables L, h, and $\phi$ is defined as same as in FIG. 5, and R denotes a downward curvature radius.

Figure 6:
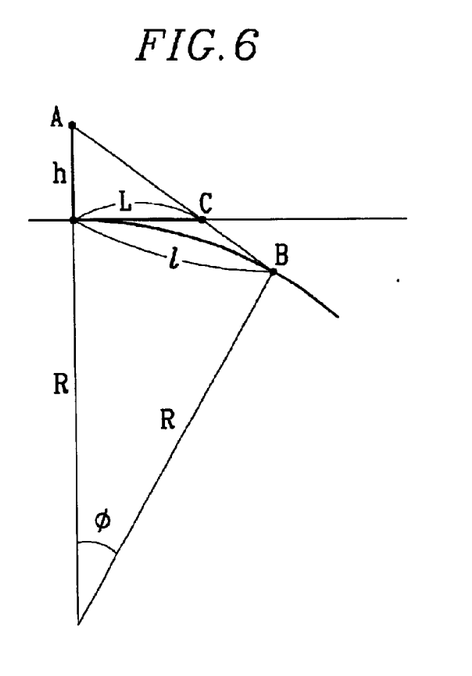
FIG. 6 is a drawing for geographically explaining how an actual distance to a target can be calculated when a forward road is curved downward.

Because of the geometrical relationship in FIG. 6, variables L, R, h and $\phi$ satisfy an equation $$L = \frac{h \cdot R \cdot \sin\phi}{h + R \cdot (1 - \cos\phi)},$$

and the ECU 120 can calculate a value of R as a value satisfying this equation.

The value of a downward curvature radius R satisfying the equation $$L = \frac{h \cdot R \cdot \sin\phi}{h + R \cdot (1 - \cos\phi)}$$

is also preferably calculated based on a predetermined map having variables of L and φ, in order to reduce calculation time.

When values of the variables φ and R are calculated, the ECU 120 calculates the actual distance l on the basis of the values of the variables φ and R at step S370.

It is obvious that the actual distance l can be calculated by an equation l=Rφ.

The effect of the above-described preferred embodiment of this invention is hereinafter described.

Table 1 shown below shows values of the horizontally estimated distance L at various values of an upward curvature radius R of a road and an actual distance l of a target on the road, where a height of a center of the camera 110 from the road is presumed to be 1.2 m.

TABLE 1

| Designed speed | Upward curvature | Actual distance to the target [m] | | | | |
|---|---|---|---|---|---|---|
| [km/h] | radius [m] | 100 | 80 | 60 | 40 | 20 |
| 120 | 7,000 | 247.0 | 129.2 | 76.4 | 44.2 | 20.5 |
| 110 | 6,000 | 327.2 | 144.0 | 80.0 | 45.0 | 20.6 |
| 100 | 5,000 | 599.9 | 171.4 | 85.7 | 46.2 | 20.7 |
| 90 | 4,000 | | 240.0 | 96.0 | 48.0 | 20.9 |
| 80 | 3,000 | | 719.6 | 120.0 | 51.4 | 21.2 |
| 70 | 2,000 | | | 150.0 | 54.5 | 21.4 |

A substantial difference between an actual distance to the target and a horizontally estimated distance exists as shown in Table 1. For example, when an upward curvature radius is 7,000 m and the target is actually 100 m away from the vehicle 130, a horizontally estimated distance is as much as 247 m. Such difference is resolved by calculating the actual distance based on the upward curvature radius and the vertical angle.

The designed speed shows a maximum permitted designed speed for a road of such curvature radius. Therefore, when a designed speed is 70 km/h, the road must have its curvature radius greater than 2,000 m. As can be seen in Table 1, such a curvature radius is very large and therefore an error possibly produced from an approximation of a road to a circle must be very small.

Table 2 shown below shows values of the horizontally estimated distance L at various values of a downward curvature radius R of a road and an actual distance l of a target on the road, where a height of a center of the camera 110 from the road is presumed to be 1.2 m.

Table 2 shows that an error possibly produced from an approximation of a road to a circle must be small and therefore a more accurate actual distance can be acquired by a method according to the embodiment of this invention.

TABLE 2

| Designed speed | Upward curvature | Actual distance to the target [m] | | | | |
|---|---|---|---|---|---|---|
| [km/h] | radius [m] | 100 | 80 | 60 | 40 | 20 |
| 120 | 20,000 | 82.8 | 70.6 | 55.8 | 38.2 | 19.8 |
| 110 | 16,000 | 79.3 | 68.6 | 54.9 | 38.4 | 19.8 |
| 100 | 10,000 | 70.6 | 63.2 | 52.2 | 37.5 | 19.7 |
| 90 | 7,500 | 64.3 | 59.0 | 50.0 | 36.7 | 19.6 |
| 80 | 5,000 | 54.5 | 52.2 | 46.2 | 35.3 | 19.4 |
| 70 | 3,000 | 41.9 | 42.3 | 40.0 | 32.7 | 18.9 |

According to the present invention, an unmanned vehicle can be realized without an additional vehicle detector because the distance from a vehicle to a target can be measured on the basis of a picture captured by a camera, and therefore an unmanned vehicle can be more cheaply produced. Moreover, accuracy is increased because a road is approximated by a circle.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A road monitoring method for a vehicle using a camera, comprising:

receiving a picture signal from said camera;

detecting a target from said picture signal;

calculating a horizontally estimated distance from said vehicle to said target;

calculating variables including a vertical angle of said target on a circumference and a curvature radius of said circumference; and calculating an actual distance from said vehicle to said target based on said vertical angle and said curvature radius.

2. The road monitoring method of claim 1, wherein said calculating a horizontally estimated distance calculates said horizontally estimated distance as a value of L satisfying an equation $$L = \alpha \cdot h \cdot \frac{f^2 + y \cdot c}{f \cdot (y - c)},$$

where α, f, h, c, and y respectively denote a proportional coefficient, a focal distance of said camera, a height of a center of said camera from a road surface, a vertical picture-coordinate of a horizon of a flat road, and a vertical picture coordinate of said target.

3. The road monitoring method of claim 1, wherein said calculating variables comprises:

determining whether a road is curved upward or downward;

calculating said vertical angle of said target on said circumference; and calculating a corresponding curvature radius among an upward curvature radius and a downward curvature radius according to a determination of said determining whether said road is curved upward or downward.

4. The road monitoring method of claim 3, wherein, in said determining whether a road is curved upward or downward, a plurality of lane markers is detected from said picture signal and whether said road is curved upward or downward is determined based on a shape of said plurality of lane markers.

5. The road monitoring method of claim 3, wherein, in said determining whether a road is curved upward or downward, it is determined that said road is curved upward if a vertical picture-coordinate of a horizon in said picture signal is higher than a predetermined vertical picture-coordinate, and it is determined that said road is curved downward if a vertical picture-coordinate of a horizon in said picture signal is lower than said predetermined vertical picture-coordinate.

6. The road monitoring method of claim 3, wherein, in said calculating said vertical angle of said target, said vertical angle of said target is calculated as a value of $\phi$ satisfying an equation $c'=f\times\tan(\phi+\theta)$, where $c'$, $f$, and $\theta$ respectively denote a vertical picture-coordinate of a horizon in said picture signal, a focal distance of said camera, a value satisfying an equation $c=f\times\tan(\theta)$ where $c$ is a vertical picture-coordinate of a horizon of a flat road.

7. The road monitoring method of claim 3, wherein, in said calculating a corresponding curvature radius, said upward curvature radius is calculated as a value of R satisfying an equation $$L = \frac{h \cdot R \cdot \sin\phi}{h - R \cdot (1 - \cos\phi)},$$

where L, h, and $\phi$ respectively denote said horizontally estimated distance, a height of a center of said camera from a road surface, and said vertical angle of said target.

8. The road monitoring method of claim 7, wherein said value of R satisfying an equation $$L = \frac{h \cdot R \cdot \sin\phi}{h - R \cdot (1 - \cos\phi)}$$

is calculated based on a predetermined map having variables of said L and said $\phi$.

9. The road monitoring method of claim 3, wherein, in said calculating a corresponding curvature radius, said downward curvature radius is calculated as a value of R satisfying an equation $$L = \frac{h \cdot R \cdot \sin\phi}{h + R \cdot (1 - \cos\phi)},$$

where L, h, and $\phi$ respectively denote said horizontally estimated distance, a height of a center of said camera from a road surface, and said vertical angle of said target.

10. The road monitoring method of claim 9, wherein said value of R satisfying an equation $$L = \frac{h \cdot R \cdot \sin\phi}{h + R \cdot (1 - \cos\phi)}$$

is calculated based on a predetermined map having variables of said L and said $\phi$.

11. The road monitoring method of claim 1, wherein, in said calculating an actual distance, said actual distance is calculated as an absolute value of l, said l satisfying an equation $l=R\phi$, where R and $\phi$ respectively denote a curvature radius of said circumference.

12. A road monitoring system for a vehicle comprising a camera for generating a picture signal and an electronic control unit for receiving said picture signal and monitoring a road based on said received picture signal, wherein said electronic control unit performs:
   detecting a target from said picture signal;
   calculating a horizontally estimated distance from said vehicle to said target;
   calculating variables including a vertical angle of said target on a circumference and a curvature radius of said circumference; and
   calculating an actual distance from said vehicle to said target based on said vertical angle and said curvature radius.

13. The road monitoring system of claim 12, wherein said calculating a horizontally estimated distance calculates said horizontally estimated distance as a value of L satisfying an equation $$L = \alpha \cdot h \cdot \frac{f^2 + y \cdot c}{f \cdot (y - c)},$$

where $\alpha$, f, h, c, and y respectively denote a proportional coefficient, a focal distance of said camera, a height of a center of said camera from a road surface, a vertical picture-coordinate of a horizon of a flat road, and a vertical picture coordinate of said target.

14. The road monitoring system of claim 12, wherein said calculating variables comprises:
   determining whether a road is curved upward or downward;
   calculating said vertical angle of said target on said circumference; and
   calculating a corresponding curvature radius among an upward curvature radius and a downward curvature radius according to a determination of said determining whether said road is curved upward or downward.

15. The road monitoring system of claim 12, wherein, in said calculating an actual distance, said actual distance is calculated as an absolute value of l, said l satisfying an equation $l=R\phi$, where R and $\phi$ respectively denote a curvature radius of said circumference.

* * * * *